Patented Nov. 9, 1926.

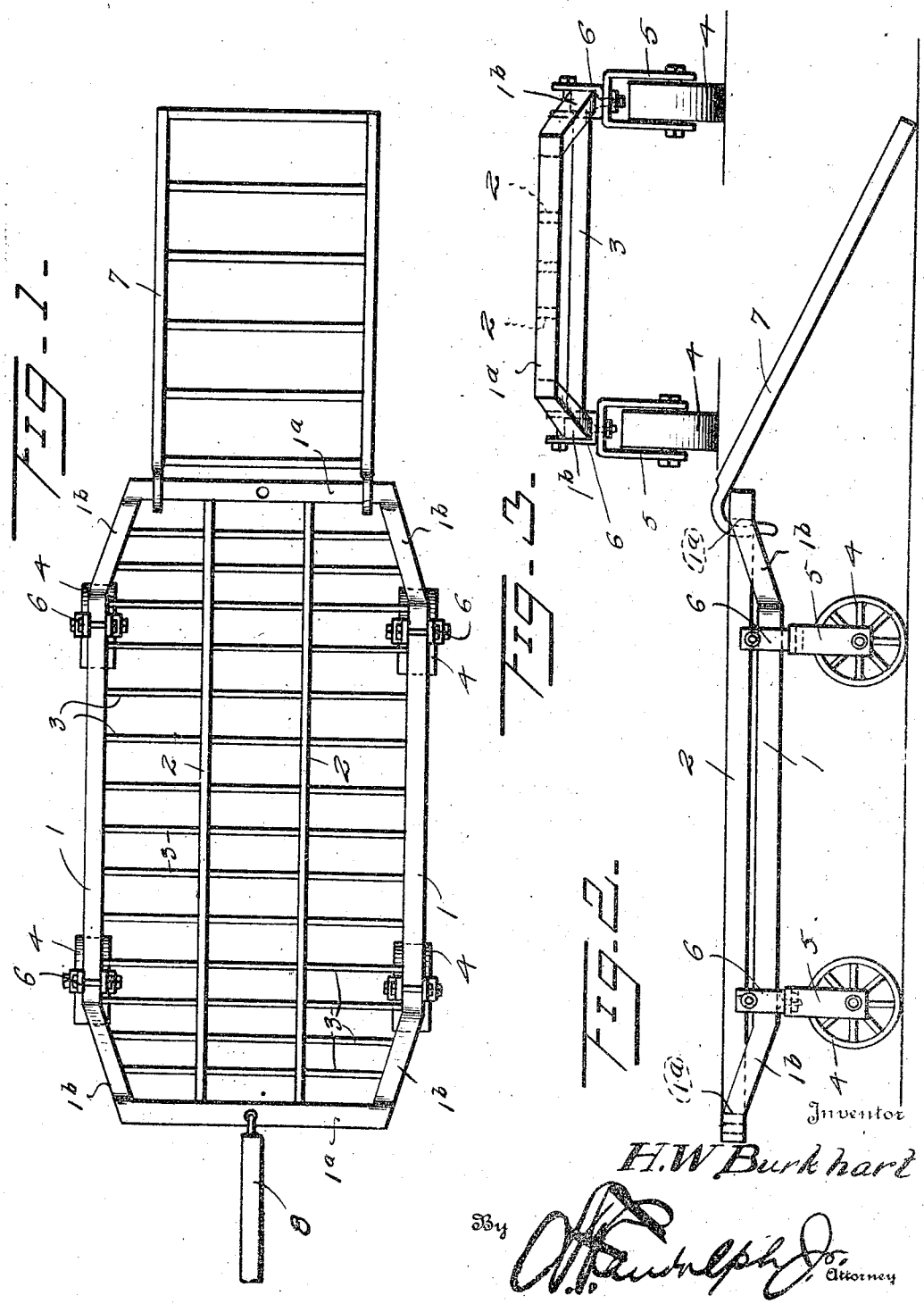

1,606,344

UNITED STATES PATENT OFFICE.

HENRY W. BURKHART, OF KNOXVILLE, TENNESSEE.

DISK-HARROW-TRANSPORTING TRUCK.

Application filed April 26, 1924. Serial No. 709,210.

The invention relates to the transporting of agricultural implements over rough roads and other surfaces and provides a truck designed particularly for the transportation of disk harrows, said truck having a platform associated therewith constituting a runway to facilitate the running of the harrow upon the truck and the running of the harrow from the truck, accordingly as the implement is loaded upon or unloaded from the truck.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a truck for transporting disk harrows embodying the invention, Figure 2 is a side view thereof, parts broken away, and Figure 3 an end view.

Corresponding and like parts are referred to in the following description and designated in the several views of the drawings by like reference characters.

The bed of the truck comprises a frame having side bars 1 and end bars 1ª. Side bars 1 have their intermediate portions on a plane lower than the plane of the bars 1ª and their ends 1ᵇ inclined upwardly and inwardly to the ends of end bars 1ª. Longitudinal bars 2 connect end bars 1ª and transverse bars 3 connect side bars 1, said transverse bars being on a plane lower than the plane of longitudinal bars 2 as clearly shown in Figure 3. The wheels 4 are mounted in U-shaped frames 5 which are pivoted to other frames 6 bolted to the side bars 1. It will thus be understood that the wheels 4 have a caster effect, thereby enabling the truck to make a short turn. A platform 7 constituting a runway, is adapted to be detachably connected to either end of the bed and the disk harrow moves thereover when run upon or off from the truck. A pole or tongue 8 is attached to the truck and the draft is applied thereto in any usual way to draw the truck over the field or roadway.

What is claimed is:

A truck for transporting disk harrows, including a frame having sides and ends, the intermediate portions of the sides being in a lower plane than the ends, the sides adjacent to the ends being inclined downwardly, longitudinal bars connecting the ends of the frame and in the same plane therewith, and transverse bars connecting the sides and arranged in a lower plane than the plane of the longitudinal bars, said longitudinal bars being adapted to support the frame of a disk harrow and the transverse bars the edges of the disks.

In testimony whereof I affix my signature.

HENRY W. BURKHART.